July 19, 1927.

H. G. DORSEY 1,636,503

VARIABLE CONDENSER

Filed Nov. 11, 1922

Inventor
Herbert Grove Dorsey.
per
Attorneys.

Patented July 19, 1927.

1,636,503

UNITED STATES PATENT OFFICE.

HERBERT GROVE DORSEY, OF GLOUCESTER, MASSACHUSETTS, ASSIGNOR TO SUBMARINE SIGNAL COMPANY, OF PORTLAND, MAINE, A CORPORATION OF MAINE.

VARIABLE CONDENSER.

Application filed November 11, 1922. Serial No. 600,349.

Variable condensers as heretofore constructed have usually been constructed with a stationary member and a movable member which may be moved to bring more or less of its plate surface into effective relation to the plate surface of the stationary member and so vary the capacity of the condenser. My invention comprises a condenser in which in place of the movable member the plates of which are always in circuit, the adjustable member comprises a series of fixed plates and an adjustable element arranged to bring any number of plates into circuit as desired, the capacity depending not upon the effective area of a series of movable plates but upon the number of stationary plates brought into effective relation to the plates of what may be called the stationary element.

My invention will be understood by reference to the drawings in which it is shown in two forms which have proved useful, though my invention may be otherwise embodied.

Figure 1:
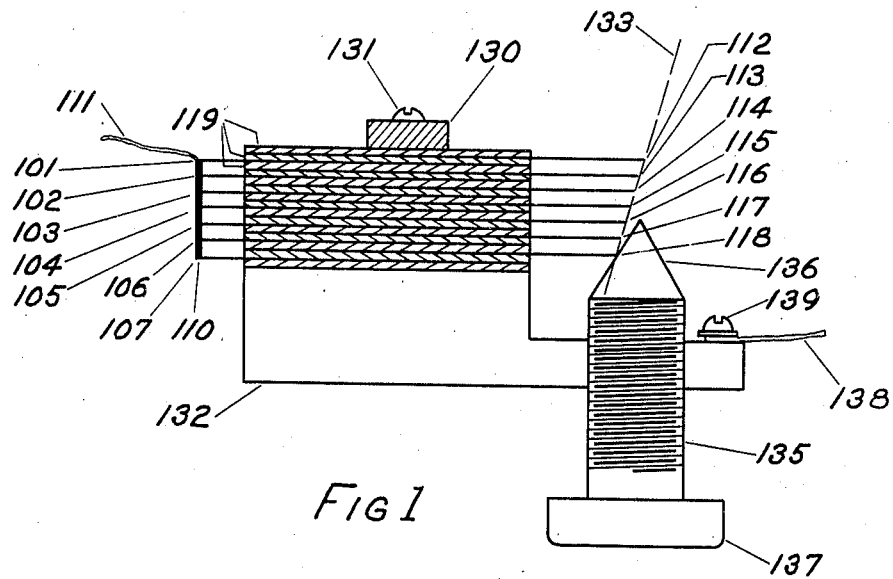
Figure 2:
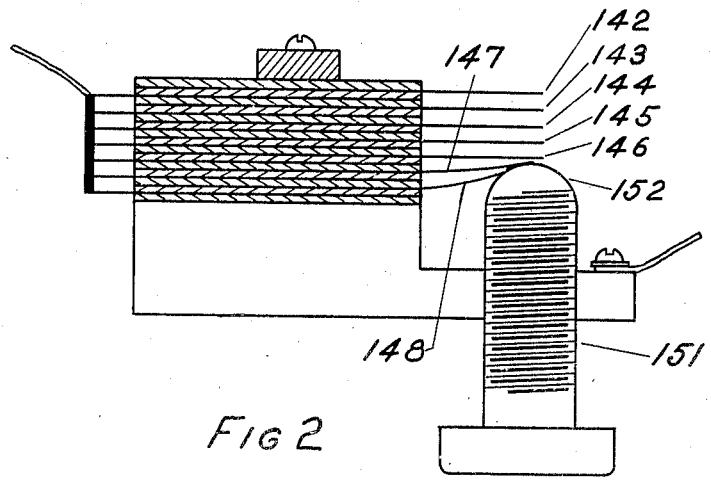

Figure 1 is an elevation of one form of my invention shown more or less diagrammatically;

Fig. 2 being a similar view of another form thereof. In radio circuits the capacities employed are small and air condensers are used, the capacities of which may be readily varied by introducing more or less of the surfaces of rotatable plates between fixed plates insulated from the rotatable plates as referred to above. The capacities required in some cases are so much greater that for mechanical reasons air condensers cannot be used and it has been necessary to devise a condenser using mica paper or other suitable dielectric as separators between the two sets of conducting plates forming the condenser. To obtain the necessary variations in capacity under such circumstances the condensers embodying my invention are built in the usual way with two sets of conducting plates separated by a suitable solid or semi-solid dielectric. The ends of one set of plates 101, 102, 103, 104, 105, 106 and 107, Fig. 1, are connected together at 110 and may be connected into circuit by wire 111. The second set of plates 112, 113, 114, 115, 116, 117 and 118 are preferably made of a flexible material such as hard rolled brass, copper or phosphor bronze and are insulated from the first set by suitable dielectric 119 such as mica, etc. The entire condenser thus formed is held together by a clamp consisting of an insulated strip 130 and screws 131 which support the condenser thus formed upon a base 132.

The novel feature of this variable condenser consists mainly in extending the plates 112, 113, 114, 115, etc. beyond the solid dielectric and providing means whereby the number of condenser plates connected in multiple can be readily varied so as to obtain the desired capacity. Another novel feature of this invention is that the extension of the conducting plates 112, 113, 114, 115, etc. or the conducting plates themselves form springs which exert a pressure upon the connecting member, thereby making a good contact. Still another novel feature of this invention is that in making an electrical connection between the tapered end 136 and the plates 112, 113, 114, 115, etc. the two surfaces rub together thereby making a cleaner contact than mere pressure alone would make.

In the form of variable condenser shown in Fig. 1 the conducting plates are given gradually varied lengths, or else are placed so that their ends come to an inclined line such as the broken line 133, and a screw 135 is provided having its end tapered as shown at 136. This screw is supported in base 132 and is so located that the side of its taper end will bear upon the outer edges of plates 112, 113, 114, 115, etc. as the screw 135 is turned in block or base 132.

By the arrangement above described if a small capacity only is desired screw 135 is withdrawn so that 136 bears only on plate 118. In this case the capacity of the condenser will be only that between plates 118 and 106 and 107. If screw 135 is turned in a reverse direction so that its cone end touches both the plates 118 and 117 the capacity of the condenser will be increased as it will be that between 118, 117 and 107, 106 and 105. An enlarged head 137 is given to screw 135 so that it may be easily turned by hand to effect the adjustment of capacity. Screw 135 may be made to pass through a metal base 132 to which wire 138 can be attached by screw 139 so that connection is made between the circuit in which the condenser is to be used and the conical end 136 of screw 135.

The variable condenser above described utilizes single plates. It is of course possible to build up condensers of the usual form and connect one side of their terminals together, and the other sides to plates, using them and the screw 135 to act in the manner above described as a switch and thus make a variable condenser the capacity of which will vary in larger steps than when single plates are used as in the variable condenser described above.

Fig. 2 shows an alternative form whereby small changes in the capacity of the condenser can be readily made. In this form the arrangement of the two groups of plates is identical with that shown in Fig. 1, but in the form shown in Fig. 2, plates 142, 143, 144, 145, etc. corresponding with the group 112, 113, etc. of Fig. 1 are of equal lengths, so that the electrical connection is made with each plate successively as screw 151 is advanced, the drawing showing the first three plates 148, 147 and 146 connected. The screw in this case has preferably a rounded end 152. If greater changes in capacity are desired than can be obtained by varying the plate area or the dielectric thickness this form may be used as a switch as was described for Fig. 1, to connect any number of separate condensers.

By using either form of variable condenser shown in Fig. 1 or Fig. 2 it will be readily understood by those versed in the art that changes in capacity commensurable with the values used in the circuit may be easily made which greatly facilitate tuning.

It will be apparent to those skilled in the art that other embodiments of my invention may be devised, the new feature therein being a variable condenser in which the number of plates in circuit may be varied rather than the area of a fixed number of plates.

What I claim as my invention is:—

1. A variable electrical condenser comprising two sets of opposed parallel plates separated by a dielectric, one set of plates extending beyond the other and the dielectric, and means for bending at will any number of the extended portion of the extended plate whereby they will make rubbing contact with said means.

2. A variable electrical condenser comprising two sets of opposed parallel plates separated by a dielectric, one set of plates extending beyond the other and the dielectric, a contact member adapted to be moved approximately perpendicular to the plates to cause the contact of a predetermined number of the plates and cause pressure between the contact member and said plates.

HERBERT GROVE DORSEY.